United States Patent
Shumway et al.

(10) Patent No.: US 11,499,408 B1
(45) Date of Patent: Nov. 15, 2022

(54) ON-SITE CONVERSION OF A FLAMMABLE WELLBORE GAS TO AN OLEAGINOUS LIQUID

(71) Applicant: Halliburton Energy Services, Inc., Houston, TX (US)

(72) Inventors: William W. Shumway, Houston, TX (US); Vladimir Gankin, Celle (DE)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/546,997

(22) Filed: Dec. 9, 2021

(51) Int. Cl.
| | |
|---|---|
| *E21B 43/40* | (2006.01) |
| *C09K 8/82* | (2006.01) |
| *E21B 43/25* | (2006.01) |
| *C10G 2/00* | (2006.01) |

(52) U.S. Cl.
CPC .............. *E21B 43/40* (2013.01); *C09K 8/82* (2013.01); *C10G 2/50* (2013.01); *E21B 43/255* (2013.01)

(58) Field of Classification Search
CPC .......... E21B 43/40; E21B 43/255; C09L 8/82
See application file for complete search history.

(56) References Cited

U.S. PATENT DOCUMENTS

| | | | |
|---|---|---|---|
| 9,309,452 B2 | 4/2016 | Elomari et al. | |
| 11,225,858 B2 * | 1/2022 | Okatsu | ............... B01D 19/0005 |
| 2005/0061396 A1 | 3/2005 | Landry et al. | |
| 2014/0250912 A1 * | 9/2014 | Huntington | ............... F02C 6/18 60/39.182 |
| 2021/0122964 A1 | 4/2021 | Lee et al. | |
| 2021/0372235 A1 * | 12/2021 | Thrash | ..................... C09K 8/62 |
| 2022/0008868 A1 * | 1/2022 | Crouch | ............... B01D 61/145 |

FOREIGN PATENT DOCUMENTS

| | | | | |
|---|---|---|---|---|
| CN | 102472095 A | * | 5/2012 | ............. C09K 8/592 |
| CN | 105713661 B | | 1/2018 | |

OTHER PUBLICATIONS

Boogaard et al., Toxicological and ecotoxicological properties of gas-to-liquid (GTL) products. 1. Mammalian toxicology, Critical Reviews in Toxicology, (2017) 47:2, 121-144, DOI: 10.1080/10408444.2016.1214676, Taylor & Francis Group.

Shell MDS (Malaysia) Sendirian Berhad, Shell GTL Saraline 185V Data Sheet, Apr. 2019.

Fleisch et al., Global Gas Flaring Reduction Partnership (GGFR), Mini-GTL Technology Bulletin, vol. 8, Dec. 2020, World Bank Document.

Elvirosa Brancaccio, GTL: Small Scale and Modular Technologies for Gas to Liquid Industry, Serintel Srl, Rome (Italy).

* cited by examiner

*Primary Examiner* — Silvana C Runyan
(74) *Attorney, Agent, or Firm* — McGuireWoods LLP

(57) ABSTRACT

Methods and systems for treating a subterranean formation. An example method performs a wellbore operation with a first treatment fluid, removes a flammable gaseous hydrocarbon from a well penetrating the subterranean formation; wherein the well is disposed on a wellsite, introduces the flammable gaseous hydrocarbon into a gas-to-liquid reactor located on the wellsite to produce an oleaginous liquid, produces a second treatment fluid comprising the oleaginous liquid at the wellsite, and introduces the second treatment fluid into the well.

20 Claims, 3 Drawing Sheets

ON-SITE CONVERSION OF A FLAMMABLE WELLBORE GAS TO AN OLEAGINOUS LIQUID

TECHNICAL FIELD

The present disclosure relates generally to drilling and other wellbore operations utilizing oleaginous liquids, and more particularly, to converting a gas that would otherwise be flared into an oleaginous liquid at the wellsite and then utilizing that oleaginous liquid in a wellbore operation at the same wellsite or in wellbore operations elsewhere.

BACKGROUND

Gaseous hydrocarbons produced from a wellsite may be flared if no transport pipeline or method of conveyance is available. These flammable hydrocarbon gases are flared to dispose of them through conversion into nonflammable forms before release. The flared gases increase carbon emissions if released.

Treatment fluids such as drilling fluids, workover fluids, completion fluids, fracturing fluids, etc. may use oleaginous liquids as a base fluid or as a component of the treatment fluid. Some of the oleaginous liquids may comprise aromatic and polyaromatic hydrocarbons which may be toxic to wellsite personnel and create environmental concerns. Thus, replacement of the oleaginous liquids with lower toxicity alternatives may be desirable. Substitution of these toxic oleaginous liquids with cost-effective lower toxicity alternatives may reduce wellsite safety concerns.

Natural hydrocarbons may be transported from a remote wellsite to a manufacturing plant, where they are processed to the quality required for the oleaginous liquids. The oleaginous liquids may then be transported from the manufacturing facility to a wellsite in a different location for use in a treatment fluid. The production of natural hydrocarbons, subsequent transport to a manufacturing plant, processing in the manufacturing plant, and the transport of the processed oleaginous liquid to a wellsite may generate significant costs and potentially increase carbon emissions.

The present invention provides improved methods and systems for the on-site production of oleaginous liquids for use in wellbore operations.

BRIEF DESCRIPTION OF THE DRAWINGS

Illustrative examples of the present disclosure are described in detail below with reference to the attached drawing figures, which are incorporated by reference herein, and wherein.

Figure 1:
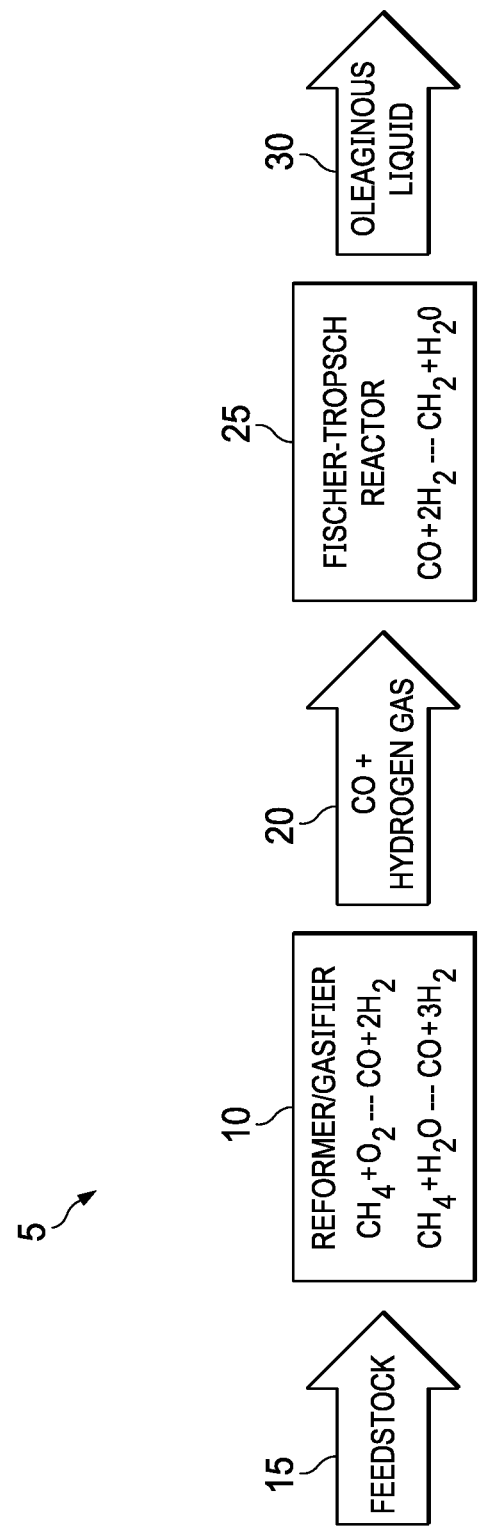
FIG. 1 is a schematic illustrating a gas-to-liquid reactor for producing a synthetic oleaginous liquid from a flammable gaseous hydrocarbon in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates generally to drilling and other wellbore operations utilizing oleaginous liquids, and more particularly, to converting a gas that would otherwise be flared into an oleaginous fluid at the wellsite and then utilizing that oleaginous fluid in a wellbore operation at the same wellsite or in wellbore operations elsewhere.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of onsite gas-to-liquid reactors to convert a gas that would otherwise be flared into a synthetic oleaginous fluid at the wellsite. The produced synthetic oleaginous liquids may then be used to produce a treatment fluid for a wellbore operation at the same wellsite. Advantageously, the gas-to-liquid reactors may be modular units of small scale that are transportable to a wellsite. These small-sized gas-to-liquid reactors may convert the flammable gaseous hydrocarbons to synthetic liquid oleaginous liquids without the need to transport the flammable gaseous hydrocarbons offsite to a refinery. Advantageously, the gas-to-liquid reactors may utilize the flammable gaseous hydrocarbons as a feedstock directly from the well. As a result, the flammable gaseous hydrocarbons are not flared and overall well emissions are comparatively reduced. The use of a waste stream to produce a treatment fluid component lowers operation costs and improves operation efficiency. As a further advantage, the synthetic oleaginous liquids do not comprise aromatic, polyaromatic, or sulfur groups and may have a lower toxicity than the traditional oleaginous liquids used on the wellsite. As another advantage the synthetic liquid oleaginous liquids are not transported offsite and are prepared onsite for use in onsite treatment fluids. Advantageously, these synthetic liquid oleaginous liquids may be tailored to provide the treatment fluid desired fluid properties. This tailoring is done directly at the wellsite without the need for offsite transport or offsite fluid formulation.

The synthetic oleaginous liquids may be produced from a gas-to-liquid reactor, hereafter "GTL reactor." The GTL reactors utilize flammable gaseous hydrocarbons (e.g., methane, ethane, propane, butane, and derivatives) as a feedstock. This feedstock may be removed from the well and fed directly into the GTL reactor or may be removed from the well and stored on the wellsite before being fed into the GTL reactor. The GTL reactor comprises a reformer/gasifier to produce carbon monoxide and hydrogen from the flammable gaseous hydrocarbons. The GTL reactor further comprises a Fischer-Tropsch reactor that converts the carbon monoxide and hydrogen into a synthetic oleaginous liquid. The synthetic oleaginous liquid does not comprise aromatic, polyaromatic, or sulfur groups. The GTL reactor may be a mini-, micro-, or small-scale reactor. A mini-scale GTL reactor has a gas feed rate of approximately less than 1 million standard cubic feet per day of feedstock. A micro-scale GTL reactor has a gas feed rate of approximately less than 0.1 million standard cubic feet per day of feedstock. A small-scale GTL reactor has a gas feed rate of approximately more than 1 million standard cubic feet per day of feedstock. The GTL reactor may be moveable and modular, allowing for transport to and from the wellsite as well as modular installation.

FIG. 1 is a schematic illustrating a gas-to-liquid reactor for producing a synthetic oleaginous liquid from a flammable gaseous hydrocarbon in accordance with the examples disclosed herein. GTL reactor 5 comprises a reformer/gasifier 10 which produces carbon monoxide and hydrogen from a feedstock 15 of flammable gaseous hydrocarbons such as methane, ethane, propane, butane, and their derivatives. The carbon monoxide and hydrogen gas 20 are directed to a Fischer-Tropsch reactor 25 which converts the gas products 20 of carbon monoxide and hydrogen gas to a synthetic oleaginous liquid 30. The synthetic oleaginous liquid 30 does not comprise aromatic, polyaromatic, or sulfur groups. In some optional examples, the GTL reactor 5 may also comprise heat recovery units which may be used for power generation.

The synthetic oleaginous liquid may comprise a hydrocarbon having between 8 and 30 carbons, and more preferably between 10-22 carbons. The hydrocarbons may be saturated or unsaturated. The produced oil is a synthetic product that can be a saturated paraffin that is linear, branched, or cyclic in structure. The produced oil can be an unsaturated olefin that is linear, branched, or cyclic in structure. The produced oil can be further reacted and modified to produce other oleaginaous products, for example, oxidation and esterification may result in a synthetic ester based oil.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
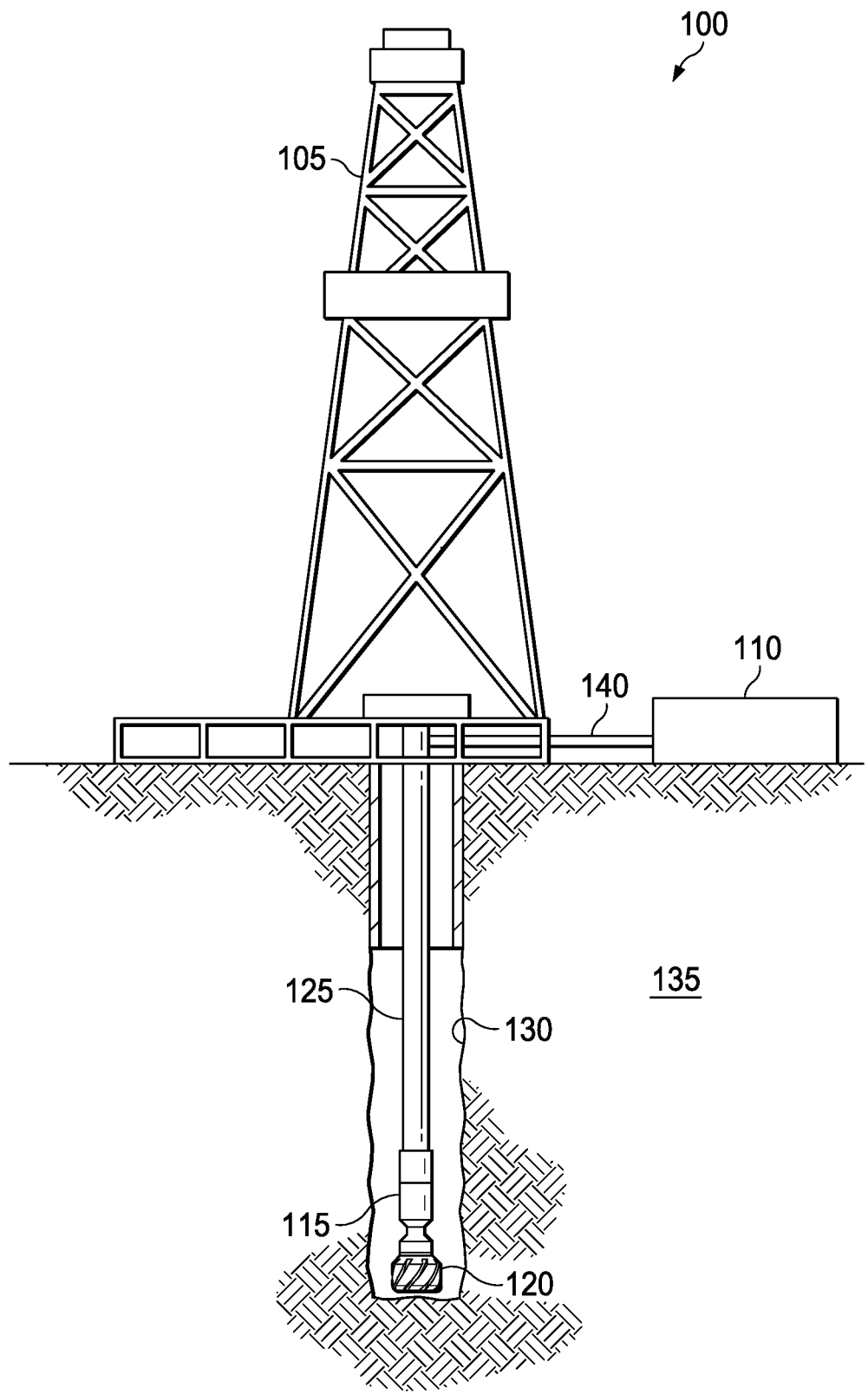
FIG. 2 illustrates a wellsite comprising a well and a gas-to-liquid reactor in accordance with the examples disclosed herein.

FIG. 2 illustrates a wellsite comprising a well and a gas-to-liquid reactor in accordance with the examples disclosed herein. Wellsite 100 comprises a drilling assembly 105 and a GTL reactor 110. The drilling assembly 105 comprises a bottom hole assembly 115 comprising a bit 120 attached to the distal end of a drill string 125 and is driven either by a downhole motor and/or via rotation of the drill string 125 from the well surface. As the bit 120 of the bottom hole assembly 115 rotates, it creates a wellbore 130 that penetrates a subterranean formation 135. In order to drill the wellbore 130, a drilling fluid, which may also be referred to as a treatment fluid, is circulated within the wellbore 130 to maintain formation pressure, lubricate the bit 120, and suspend and circulate the cuttings to the surface. In the illustrated embodiment, the drilling fluid comprises an oleaginous liquid.

During the drilling of the wellbore 130, flammable gaseous hydrocarbons may enter the wellbore 130 from the surrounding subterranean formation 135. In some traditional operations, these flammable gaseous hydrocarbons may be flared to dispose of them, preventing their release into the atmosphere. In the illustrated wellsite 100, the flammable gaseous hydrocarbons are directly conveyed via conduit 140 to the GTL reactor 110. This direct connection via conduit 140 may be a pipeline or other such conveyance which can flow the flammable gaseous hydrocarbons to the GTL reactor 110 at a desired feed rate. In alternative examples, the connection may not be direct and conduit 140 may convey the flammable gaseous hydrocarbons to an onsite storage vessel for later use in the GTL reactor 110. In all examples, the flaring of the flammable gaseous hydrocarbons is not done or is reduced relative to a traditional operation.

The GTL reactor 110 may convert the flammable gaseous hydrocarbon feedstock into a synthetic oleaginous liquid. The synthetic oleaginous liquid may then be added to the drilling fluid as a substitute or in addition to the oleaginous liquid present in the drilling fluid. Should a substitution be made, the synthetic oleaginous liquid may provide a less toxic and more environmentally friendly drilling fluid as the synthetic oleaginous fluid does not comprise aromatics, polyaromatics, or sulfur containing compounds. Thus, the use of the synthetic oleaginous liquid in the treatment fluid formulation may reduce personnel risks and potential environmental damage. The new reformulated drilling fluid may then be used to continue drilling of the wellbore 130.

The synthetic oleaginous liquid is produced at the wellsite 100, and as such, requires minimal transportation to use it in the preparation of the drilling fluid. In some optional examples, the synthetic oleaginous liquid may be tailored at the wellsite to provide the drilling fluid with specific properties that would be desirable as the well is drilled. For example, the synthetic oleaginous liquid may be tailored to produce a drilling fluid with a reduced circulating density or with an increased flash point. In traditional operations, the oleaginous liquid is produced offsite at locations such as refineries and then brought to the wellsite 100 for use. In these traditional operations, the oleaginous liquid has already been manufactured and thus cannot be formulated differently should an alteration in the fluid properties of the oleaginous liquid be desired. For example, the wellbore conditions may change in a way in which the fluid properties of the drilling fluid are no longer best suited for the operation. Locating the GTL reactor on the wellsite 100 provides the ability to do on-the-fly reformulating of the synthetic oleaginous liquid which may be used to adjust the treatment fluid to these changing wellbore conditions. Moreover, the waste stream of the flammable gaseous hydrocarbons is converted into a valuable feedstock, reducing treatment fluid and overall operational costs.

In some optional examples, more synthetic oleaginous liquid may be produced than needed at the wellsite. In these examples, the synthetic oleaginous liquid may be stored on-site for later use in a treatment fluid or the synthetic oleaginous liquid may be transported to another wellsite for use in a treatment fluid at that wellsite location.

It should be noted that while FIG. 2 generally depicts a land-based drilling assembly 105, those skilled in the art will readily recognize that the principles described herein are equally applicable to subsea drilling operations that employ floating or sea-based platforms and rigs, without departing from the scope of the disclosure.

The treatment fluid may comprise a drilling fluid, a drill-in fluid, a fracturing fluid, a completion fluid such as a cement, a clean-up fluid, a spotting fluid, a workover fluid, a treatment pill or any combination thereof. The drilling fluid may be any drilling fluid including aqueous-based drilling fluids, oil-based drilling fluids, synthetic drilling fluids, invert-emulsion based drilling fluids, and the like. In some optional examples, the treatment fluid may be introduced into the wellbore 130 as a pill. A pill is a relatively small quantity (e.g., less than about 500 bbl) of a treatment fluid used to accomplish a specific task that the regular treatment fluid may not be able to perform due to its formulation or fluid properties.

The synthetic oleaginous liquid may be used as the base fluid of the treatment fluid or may be a non-base fluid component of the treatment fluid. If the synthetic oleaginous liquid is the base fluid, the additional fluid components may be added to the synthetic oleaginous liquid in any manner to produce the treatment fluid. For example, the components of the treatment fluid may be mixed while being pumped into the wellbore 130 in an on-the-fly mixing operation. As another example, the other treatment fluid components may be added to the synthetic oleaginous liquid at the surface prior to being introduced into the wellbore 130. If the synthetic oleaginous liquid is a non-base treatment fluid component, the synthetic oleaginous liquid may be added to the base fluid of the treatment fluid prior to or as the base fluid is being introduced into the wellbore 130. In some examples, the synthetic oleaginous liquid may be added to a mud pit storing an already circulated treatment fluid. In any example, the addition of the synthetic oleaginous liquid may reformulate the treatment fluid before it is circulated or recirculated.

In some examples, the treatment fluid comprises an aqueous fluid, for example, as with a water-based drilling fluid. The aqueous fluid may be from any source, provided that it does not contain an excess of compounds that may undesirably affect other components in the treatment fluid. In various examples, the aqueous fluid may comprise fresh water, salt water, seawater, brine, or an aqueous salt solution. In some examples, the aqueous fluid may comprise a monovalent brine or a divalent brine. Suitable monovalent brines include, but are not limited to, sodium chloride brines, sodium bromide brines, potassium chloride brines, potassium bromide brines, cesium formate brines, and the like. Suitable divalent brines include, but are not limited to, magnesium chloride brines, calcium chloride brines, calcium bromide brines, calcium nitrate brines and the like.

In examples, where the treatment fluid comprises an aqueous fluid, the pH of the fluid may be in a range of from about 7 to about 13. In some further optional examples, the pH range may be about 8 to about 12. The treatment fluid may be used for wellbore operations comprising wellbore temperatures in a range of from about 30° F. to about 450° F. In some other examples, the temperature range may be from about 40° F. to about 350° F. The treatment fluids may be oil-in-water emulsions where the internal phase makes up to about 50% of the treatment fluid. In some further optional examples, the internal phase makes up to about 40% of the treatment fluid. The internal phase may be entirely the synthetic oleaginous liquid or may comprise the synthetic oleaginous liquid and an additional component or components including other types of oleaginous liquids.

In some examples, the treatment fluid may be an oil-based treatment fluid or a synthetic-based treatment fluid, for example, an oil-base drilling fluid or a synthetic-based drilling fluid. In these examples, the synthetic oleaginous liquid may make up 100% of the treatment fluid or may comprise 100% of the base fluid with additives added in to alter fluid properties. In alternative examples, the oil-based treatment fluid or a synthetic-based treatment fluid may be an emulsion with the external phase comprising the synthetic oleaginous liquid.

In these optional examples of water-in-oil emulsions, the emulsion may comprise an external phase of about 40% to about 99% of the treatment fluid. In some further optional examples, the external phase comprises about 50% to about 95% of the treatment fluid, alternatively about 50% to about 90% of the treatment fluid. The external phase may be entirely the synthetic oleaginous liquid or may be the synthetic oleaginous liquid and an additional component or components including other types of oleaginous liquids. The internal phase may comprise any suitable aqueous fluid or aqueous-compatible material. In some optional examples, salts or hydrophilic organic molecules (e.g., alcohols) may be added to the internal phase to improve emulsion stability under wellbore conditions. The treatment fluid may be used for wellbore operations comprising wellbore temperatures in a range of from about 30° F. to about 450° F.

In some other examples, the temperature range may be from about 40° F. to about 350° F. In some further optional examples, the treatment fluid may include a base to avoid excess acids generated while drilling. In all examples, the synthetic oleaginous liquid may be added to the treatment fluid to alter fluid properties or to prepare a treatment fluid tailored for a specific wellbore operation and/or environment.

The treatment fluids discussed herein may directly or indirectly affect the various downhole equipment and tools that may come into contact with the treatment fluids such as, but not limited to, the drill string, any floats, drill collars, mud motors, downhole motors and/or pumps associated with the drill string, and any MWD/LWD tools and related telemetry equipment, sensors or distributed sensors associated with the drill string. The disclosed treatment fluid may also directly or indirectly affect any downhole heat exchangers, valves and corresponding actuation devices, tool seals, packers and other wellbore isolation devices or components, and the like associated with the wellbore. The disclosed treatment fluid may also directly or indirectly affect the bottom hole assembly, which may include, but is not limited to, roller cone bits, PDC bits, natural diamond bits, any hole openers, reamers, coring bits, etc.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

Figure 3:
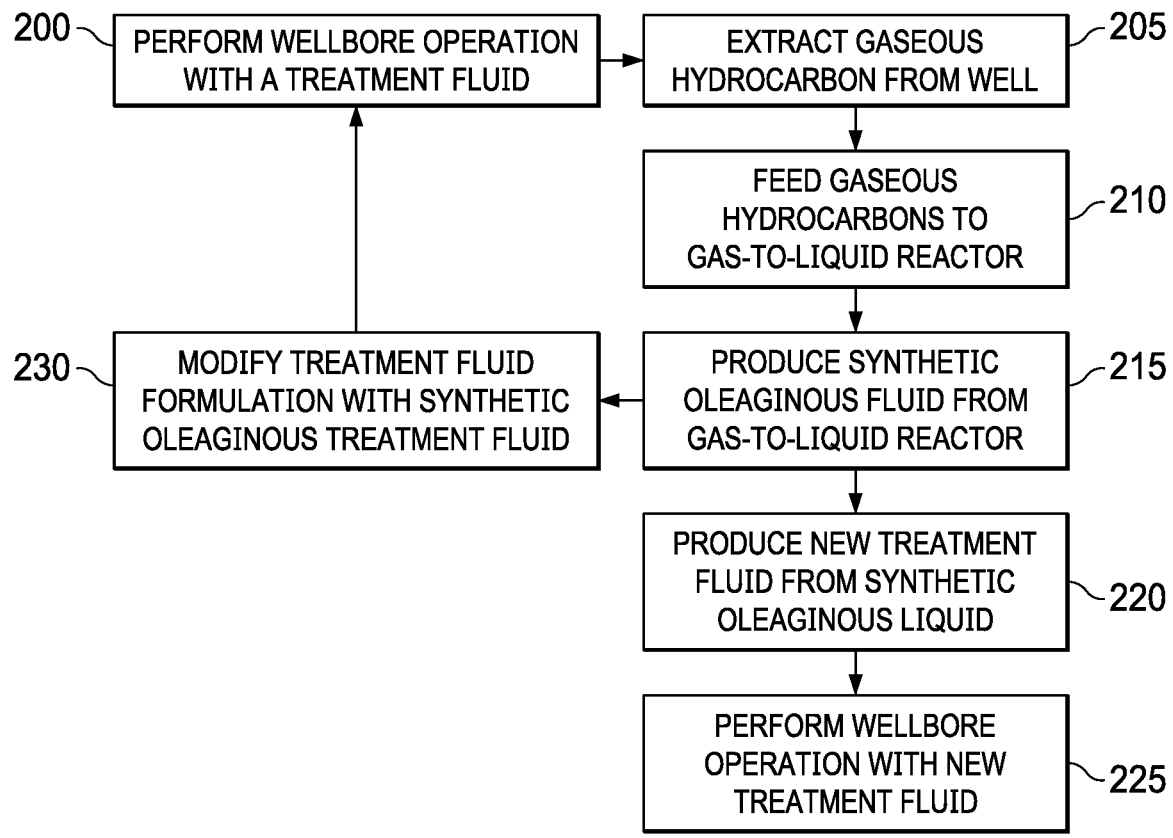
FIG. 3 illustrates a flowchart describing an example method of treating a formation with a synthetic oleaginous liquid produced from a gas-to-liquid reactor in accordance with the examples disclosed herein.

FIG. 3 illustrates a flowchart describing an example method of treating a formation with a synthetic oleaginous liquid produced from a GTL reactor in accordance with the examples disclosed herein. It is to be understood that every operation in the flowchart of FIG. 3 occurs at the wellsite and components such as the flammable gaseous hydrocarbons are not shipped offsite to be processed or disposed of. At operation 200, a wellbore operation is performed with a treatment fluid. The wellbore operation may be any wellbore operation utilizing a treatment fluid and the treatment fluid may be any treatment fluid comprising an oleaginous liquid. The oleaginous liquid may be a synthetic oleaginous liquid produced previously from a GTL reactor or the oleaginous liquid may not be a synthetic oleaginous liquid produced from a GTL reactor. Examples of the wellbore operation include, but are not limited to, drilling operations, completion operations, cleanup operations, fracturing operations, production operations, the like, or any combination thereof. Examples of the treatment fluid include, but are not limited to, drilling fluids, workover fluids, completion fluids, fracturing fluids, cements, spotting fluids, the like, or any combination thereof.

At operation 205, gaseous flammable hydrocarbons are extracted from the well. The gaseous flammable hydrocarbons may be used as a feedstock for a GTL reactor. The gaseous flammable hydrocarbons may be directly or indirectly conveyed to the GTL reactor at a desired feed rate. Examples of the flammable gaseous hydrocarbons include, but are not limited to, natural gas, methane, ethane, propane, butane, any derivatives, or any combination thereof.

At operation 210, the flammable gaseous hydrocarbons are input into the GTL reactor as a feedstock. The reaction parameters of the GTL reactor may be adjusted to produce an output of specific species of hydrocarbons for the synthetic oleaginous liquid. This specially selected synthetic oleaginous liquid may be used to tailor a treatment fluid to have specific fluid properties such as a specific circulating density, flashpoint, pour point, etc.

At operation 215, the synthetic oleaginous liquid is produced and extracted from the GTL reactor. The synthetic oleaginous liquid may be stored for future use or used to produce or reformulate a treatment fluid.

At operation 220, a new treatment fluid is produced from the synthetic oleaginous liquid. If the reaction parameters were specifically set to produce a synthetic oleaginous liquid having a specific hydrocarbon blend at operation 210, then the resulting treatment fluid will have the desired fluid properties due to the incorporation of the specially selected synthetic oleaginous liquid.

At operation 225, the new treatment fluid is used to perform a wellbore operation. The wellbore operation may be the same or a different wellbore operation from the wellbore operation performed in operation 200.

Returning to operation 215, an alternative path may be chosen. After the synthetic oleaginous liquid is produced from the gas-to-liquid reactor, the synthetic oleaginous liquid may be incorporated into the treatment fluid used in operation 200.

At operation 230, the synthetic oleaginous liquid is added to the existing treatment fluid used in operation 200. If the reaction parameters were specifically set to produce a synthetic oleaginous liquid having a specific hydrocarbon blend at operation 210, then the reformulated treatment fluid will have the desired fluid properties due to the incorporation of the specially selected synthetic oleaginous liquid.

After the treatment fluid has been reformulated, operation 200 may be continued and a wellbore operation may be performed or continued to be performed with the reformulated treatment fluid.

As the synthetic oleaginous liquids replace the use of natural hydrocarbons in a treatment fluid, less natural hydrocarbons need to be sent to a manufacturing facility (e.g., a refinery) to be processed and then returned to the wellsite for use in a treatment fluid. The amount of replaced natural hydrocarbons would be equivalent to the amount of processed natural hydrocarbons that would need to be output from the manufacturing facility and sent back to the wellsite for use in a treatment fluid. For example, if a wellsite required 100 barrels of a processed natural hydrocarbon for use in on-site treatment fluids, the wellsite would need to send an amount of natural hydrocarbons to the manufacturing facility that is greater than 100 barrels to receive a return of the 100 barrels of processed natural hydrocarbons. As the synthetic oleaginous liquids are produced onsite from the waste stream of the flammable gaseous hydrocarbons, less of the natural hydrocarbons may be produced as they are no longer needed for treatment fluid use, or the natural hydrocarbons may be used for purposes other than treatment fluid components.

It should be clearly understood that the example method illustrated by FIG. 3 is merely a general application of the principles of this disclosure in practice, and a wide variety of other examples are possible. Therefore, the scope of this disclosure is not limited in any manner to the details of FIG. 3 as described herein.

The treatment fluids described herein comprise a synthetic oleaginous liquid. The synthetic oleaginous liquid does not comprise aromatic, polyaromatic, or sulfur groups. Examples of molecules comprising aromatic, polyaromatic, and/or sulfur groups include, but are not limited to, benzene, toluene, ethylbenzene, xylene, the like, derivatives of, or any combinations of.

Properties of the treatment fluid may be adjusted by adjusting the reaction parameters of the GTL reactor to adjust the formulation of the synthetic oleaginous liquid. The synthetic oleaginous liquid comprises a hydrocarbon or a blend of hydrocarbons. The reaction parameters such as reaction time, reaction temperature, reaction pressure, reactant concentration, etc. may be adjusted to produce a synthetic oleaginous liquid comprising a specific hydrocarbon or specific blend of hydrocarbons. The reaction parameters may be adjusted to produce a specific synthetic oleaginous liquid which will provide a treatment fluid with the desired properties best suited for present wellbore conditions. Alternatively, the reaction parameters may be adjusted to produce a specific synthetic oleaginous liquid which will reformulate an existing treatment fluid to be better suited for present wellbore conditions. The onsite presence of the GTL reactor and the use of an onsite feedstock allows for on-the-fly production of or adjustment of treatment fluids to adapt to changing wellbore conditions. Treatment fluid properties that may be adjusted include, but are not limited to circulating density, flashpoint, pour point, viscosity, lubricity, dilution, tracking, the like, and a combination of properties. In some optional examples, prior to the use of or adjustment of the treatment fluid, measuring and sensing tools may be deployed to measure current wellbore conditions. The treatment fluid may then be formulated onsite in response to the measured wellbore conditions. The treatment fluid may then be used in a wellbore operation. The measuring and sensing equipment may continue to be utilized to further adjust the treatment fluid onsite as needed or to produce a new better suited treatment fluid. The wellbore conditions which may be measured include wellbore temperature, pressure, breathing, heaving, swelling, combinations of conditions, and the like. In addition, rig operating parameters may also be monitored including torque and drag, weight on bit, stick slip of the bit, fluid returns to surface, pump speed, solids control equipment efficacy, combinations of parameters, and the like.

In some optional examples, the treatment fluid may comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, fluid loss control additives, gas, catalysts, clay control agents, dispersants, flocculants, scavengers (e.g., $H_2S$ scavengers, CO2 scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

It is also to be recognized that the disclosed treatment fluids may also directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-3.

Provided are methods of treating a subterranean formation in accordance with the disclosure and the illustrated FIGs. An example method comprises performing a wellbore operation with a first treatment fluid, removing a flammable gaseous hydrocarbon from a well penetrating the subterranean formation, wherein the well is disposed on a wellsite, introducing the flammable gaseous hydrocarbon into a gas-to-liquid reactor located on the wellsite to produce an oleaginous liquid, producing a second treatment fluid comprising the oleaginous liquid at the wellsite, and introducing the second treatment fluid into the well.

Additionally or alternatively, the method may include one or more of the following features individually or in combination. The second treatment fluid may be the same type of treatment fluid as the first treatment fluid and may be a reformulation of the first treatment fluid produced by incorporating the oleaginous liquid into the first treatment fluid. The second treatment fluid may reformulate the first treatment fluid by altering a fluid property of the first treatment fluid. The fluid property may be the circulating density, flashpoint, pour point, viscosity, lubricity, dilution, fluid tracking, or a combination thereof. A reaction parameter of the gas-to-liquid reactor may be adjusted to produce the oleaginous liquid, wherein the oleaginous liquid is produced to have a composition to alter the fluid property. The reaction parameter may be the reaction time, reaction temperature, reaction pressure, reactant concentration, or a combination thereof. The fluid property may be adjusted in response to a change in a wellbore condition. The wellbore condition may be the temperature, pressure, breathing, heaving, swelling, or a combination thereof. The second treatment fluid may be a different type of treatment fluid from the first treatment fluid and may not be produced by incorporating the oleaginous liquid into the first treatment fluid. The flammable gaseous hydrocarbon may comprise methane, ethane, butane, propane, or a combination thereof. The oleaginous liquid may not comprise a hydrocarbon having an aromatic, polyaromatic, or sulfur group. A conduit may directly convey the flammable gaseous hydrocarbon from the well to the gas-to-liquid reactor. The flammable gaseous hydrocarbon may be stored in a vessel prior to being introduced into the gas-to-liquid reactor. The second treatment fluid may be a drilling fluid, workover fluid, completion fluid, fracturing fluid, cement, spotting fluid, or any combination thereof. The gas-to-liquid reactor may be a small-, micro-, or mini-scale gas-to-liquid reactor.

Provided are systems for treating a subterranean formation in accordance with the disclosure and the illustrated FIGs. An example system comprises a well located on a wellsite, a flammable gaseous hydrocarbon produced from the well, a gas-to-liquid reactor located on the wellsite, and a treatment fluid comprising an oleaginous liquid produced from the flammable gaseous hydrocarbon after reaction in the gas-to-liquid reactor.

Additionally or alternatively, the system may include one or more of the following features individually or in combination. The flammable gaseous hydrocarbon may comprise methane, ethane, butane, propane, or a combination thereof. The oleaginous liquid may not comprise a hydrocarbon having an aromatic, polyaromatic, or sulfur group. A conduit may directly convey the flammable gaseous hydrocarbon from the well to the gas-to-liquid reactor. The flammable gaseous hydrocarbon may be stored in a vessel prior to being introduced into the gas-to-liquid reactor. The treatment fluid may be a drilling fluid, workover fluid, completion fluid, fracturing fluid, cement, spotting fluid, or any combination thereof. The gas-to-liquid reactor may be a small-, micro-, or mini-scale gas-to-liquid reactor.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for treating a subterranean formation, the method comprising:
    performing a wellbore drilling operation with a first drilling fluid at a wellsite,
    removing a flammable gaseous hydrocarbon from a well penetrating the subterranean formation, wherein the well is disposed on the wellsite,
    introducing the flammable gaseous hydrocarbon into a gas-to-liquid reactor located on the wellsite to produce an oleaginous liquid,
    producing a second drilling fluid comprising the oleaginous liquid at the wellsite, and
    introducing the second drilling fluid into the well; wherein the second drilling fluid is a reformulation of the first drilling fluid produced by incorporating the oleaginous liquid into the first drilling fluid.

2. The method of claim 1, wherein the second drilling fluid reformulates the first drilling fluid by altering a fluid property of the first drilling fluid.

3. The method of claim 2, wherein the fluid property is circulating density, flashpoint, pour point, viscosity, lubricity, dilution, fluid tracking, or a combination thereof.

4. The method of claim 3, wherein a reaction parameter of the gas-to-liquid reactor is adjusted to produce the oleaginous liquid, wherein the oleaginous liquid is produced to have a composition to alter the fluid property.

5. The method of claim 4, wherein the reaction parameter is reaction time, reaction temperature, reaction pressure, reactant concentration, or a combination thereof.

6. The method of claim 2, wherein the fluid property is adjusted in response to a change in a wellbore condition.

7. The method of claim 6, wherein the wellbore condition is temperature, pressure, swelling, or a combination thereof.

8. The method of claim 1, wherein the flammable gaseous hydrocarbon comprises methane, ethane, butane, propane, or a combination thereof.

9. The method of claim 1, wherein the oleaginous liquid does not comprise a hydrocarbon having an aromatic, polyaromatic, or sulfur group.

10. The method of claim 1, wherein a conduit directly connects the flammable gaseous hydrocarbon from the well to the gas-to-liquid reactor.

11. The method of claim 1, wherein the flammable gaseous hydrocarbon is stored in a vessel prior to being introduced into the gas-to-liquid reactor.

12. The method of claim 1, wherein the gas-to-liquid reactor is a small-scale gas-to-liquid reactor having a gas feed rate of more than 1 million standard cubic feet per day of feedstock, a micro-scale gas-to-liquid reactor having a gas feed rate of less than 0.1 million standard cubic feet per day of feedstock, or a mini-scale gas-to-liquid reactor having a gas feed rate of less than 1 million standard cubic feet per day of feedstock.

13. A system for treating a subterranean formation, the system comprising:
    a well located on a wellsite,
    a flammable gaseous hydrocarbon produced from the well,
    a gas-to-liquid reactor located on the wellsite, and
    a drilling fluid comprising an oleaginous liquid produced from the flammable gaseous hydrocarbon after reaction in the gas-to-liquid reactor.

14. The system of claim 13, wherein the flammable gaseous hydrocarbon comprises methane, ethane, butane, propane, or a combination thereof.

15. The system of claim 13, wherein the oleaginous liquid does not comprise a hydrocarbon having an aromatic, polyaromatic, or sulfur group.

16. The system of claim 13, further comprising a conduit that directly connects the flammable gaseous hydrocarbon from the well to the gas-to-liquid reactor.

17. The system of claim 13, wherein the oleaginous liquid is produced to have a composition to alter a fluid property of the drilling fluid; wherein the gas-to-liquid reactor is configured to adjust the production of the oleaginous liquid so that the oleaginous liquid is capable of altering the fluid property.

18. The system of claim 17, wherein the fluid property is circulating density, flashpoint, pour point, viscosity, lubricity, dilution, fluid tracking, or a combination thereof.

19. The system of claim 17, wherein a reaction parameter of the gas-to-liquid reactor is adjusted to produce the oleaginous liquid.

20. The system of claim 19, wherein the reaction parameter is reaction time, reaction temperature, reaction pressure, reactant concentration, or a combination thereof.

* * * * *